United States Patent
Shim et al.

(10) Patent No.: US 10,150,708 B2
(45) Date of Patent: Dec. 11, 2018

(54) SURFACE-AIDED MELT INFILTRATION FOR PRODUCING A CERAMIC MATRIX COMPOSITE

(71) Applicant: Rolls-Royce High Temperature Composites, Inc., Cypress, CA (US)

(72) Inventors: Sungbo Shim, Irvine, CA (US); Andrew Lazur, Huntington Beach, CA (US); Robert Shinavski, Mission Viejo, CA (US)

(73) Assignee: ROLLS-ROYCE HIGH TEMPERATURE COMPOSITES INC., Cypress, CA (US)

( * ) Notice: Subject to any disclaimer, the term of this patent is extended or adjusted under 35 U.S.C. 154(b) by 274 days.

(21) Appl. No.: 15/147,209

(22) Filed: May 5, 2016

(65) Prior Publication Data
US 2016/0326064 A1    Nov. 10, 2016

Related U.S. Application Data

(60) Provisional application No. 62/158,978, filed on May 8, 2015.

(51) Int. Cl.
*C04B 35/565*   (2006.01)
*F23R 3/00*      (2006.01)
(Continued)

(52) U.S. Cl.
CPC .......... *C04B 35/565* (2013.01); *C04B 35/573* (2013.01); *C04B 35/806* (2013.01);
(Continued)

(58) Field of Classification Search
CPC ... C04B 35/573; C04B 35/565; C04B 35/806; C04B 2235/5244; C04B 2235/524;
(Continued)

(56) References Cited

U.S. PATENT DOCUMENTS 6,316,048 B1    11/2001 Steibel et al.
6,403,158 B1 *   6/2002 Corman ................ C04B 35/573
                                                        264/101

(Continued)

FOREIGN PATENT DOCUMENTS

EP    1683771 A1 *  7/2006 ........... C04B 35/573
EP    1 683 771 B1   8/2008

OTHER PUBLICATIONS

Raether, Friedrich, "Ceramic Matrix Composites—an Alternative for Challenging Construction Tasks", *Ceramicapplications*, 1,1 (2013), pp. 45-49.

*Primary Examiner* — William P Fletcher, III
(74) *Attorney, Agent, or Firm* — Brinks Gilson & Lione

(57) ABSTRACT

A method of melt infiltration for producing a ceramic matrix composite comprises applying a surface slurry onto one or more outer surfaces of an impregnated porous preform. The surface slurry comprises a solvent and particulate solids, and the preform comprises a framework of ceramic fibers loaded with particulate matter. The surface slurry is dried to form a porous layer comprising the particulate solids on the one or more outer surfaces of the impregnated porous preform. After forming the porous layer, an end portion of the impregnated porous preform that includes at least part of the porous layer is immersed in a molten material, and the molten material is infiltrated into the impregnated porous preform from the end portion. The porous layer serves as a wick to transport the molten material over the one or more outer surfaces, thereby enabling melt infiltration of the impregnated porous preform from other portions thereof.

15 Claims, 2 Drawing Sheets

(51) Int. Cl.
    *F01D 5/28*         (2006.01)
    *C04B 35/573*    (2006.01)
    *C04B 35/80*     (2006.01)

(52) U.S. Cl.
    CPC ............ *F01D 5/282* (2013.01); *F01D 5/284* (2013.01); *F23R 3/007* (2013.01); *C04B 2235/3217* (2013.01); *C04B 2235/3463* (2013.01); *C04B 2235/3821* (2013.01); *C04B 2235/3826* (2013.01); *C04B 2235/3873* (2013.01); *C04B 2235/404* (2013.01); *C04B 2235/424* (2013.01); *C04B 2235/425* (2013.01); *C04B 2235/427* (2013.01); *C04B 2235/524* (2013.01); *C04B 2235/5224* (2013.01); *C04B 2235/5228* (2013.01); *C04B 2235/5244* (2013.01); *C04B 2235/616* (2013.01); *F05D 2240/11* (2013.01); *F05D 2300/6033* (2013.01)

(58) Field of Classification Search
    CPC ...... C04B 2235/5224; C04B 2235/427; C04B 2235/425; C04B 2235/424; C04B 2235/3821; C04B 2235/3217; C04B 2235/616; C04B 2235/5228; C04B 2235/3826; C04B 2235/404; C04B 2235/3873; C04B 2235/3463; F23R 3/007; F01D 5/282; F01D 5/284; F05D 2240/11; F05D 2300/6033
    USPC ........................................................ 427/228
    See application file for complete search history.

(56) References Cited

U.S. PATENT DOCUMENTS

| | | | |
|---|---|---|---|
| 7,597,838 | B2 | 10/2009 | Subramanian et al. |
| 7,708,851 | B2 | 5/2010 | Corman et al. |
| 8,043,720 | B2 | 10/2011 | Corman et al. |
| 8,075,827 | B2 | 12/2011 | Loukus et al. |
| 8,900,661 | B2 | 12/2014 | Schmidt et al. |
| 2004/0207133 | A1* | 10/2004 | Williams ................ C04B 35/56 264/640 |
| 2013/0287941 | A1 | 10/2013 | Gray |
| 2014/0271153 | A1 | 9/2014 | Uskert et al. |
| 2016/0214907 | A1* | 7/2016 | Shim ..................... C04B 41/009 |

\* cited by examiner

SURFACE-AIDED MELT INFILTRATION FOR PRODUCING A CERAMIC MATRIX COMPOSITE

RELATED APPLICATIONS

The present patent document claims the benefit of priority under 35 U.S.C. § 119(e) to U.S. Provisional Patent Application No. 62/158,978, filed on May 8, 2015, and hereby incorporated by reference in its entirety.

TECHNICAL FIELD

The present disclosure is directed generally to the fabrication of ceramic matrix composites and more particularly to a method to improve the melt infiltration of a porous preform.

BACKGROUND

Ceramic matrix composites, which include ceramic fibers embedded in a ceramic matrix, exhibit a combination of properties that make them promising candidates for industrial applications that demand excellent thermal and mechanical properties along with low weight, such as gas turbine engine components. Typically, one of the final steps in the fabrication of a ceramic matrix composite is melt infiltration, in which a molten material is infiltrated into a porous preform that includes the ceramic fibers. The melt infiltration process may be time consuming in the case of large components or parts having a complex geometry.

BRIEF SUMMARY

A method of melt infiltration for producing a ceramic matrix composite comprises applying a surface slurry onto one or more outer surfaces of an impregnated porous preform. The surface slurry comprises a solvent and particulate solids, and the impregnated porous preform comprises a framework of ceramic fibers loaded with particulate matter. The surface slurry is dried to form a porous layer comprising the particulate solids on the one or more outer surfaces of the impregnated porous preform. After forming the porous layer, an end portion of the impregnated porous preform that includes at least part of the porous layer is immersed in a molten material, and the molten material is infiltrated into the impregnated porous preform from the end portion. The porous layer serves as a wick to transport the molten material over the one or more outer surfaces, thereby enabling melt infiltration of the impregnated porous preform from other portions thereof.

A ceramic matrix composite (CMC) component comprises a composite body having a ceramic coating on one or more surfaces thereof. The composite body includes ceramic fibers dispersed in a ceramic matrix and contains an amount of residual metal of about 5 vol. % or less. The ceramic coating has a surface finish comprising an average surface roughness ($R_a$) of about 200 micro-inches or less.

DETAILED DESCRIPTION

Figure 1:
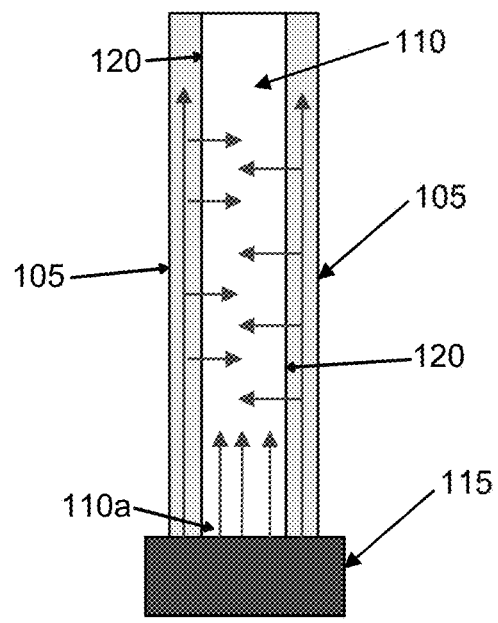
FIG. 1 is a schematic showing a melt infiltration process carried out on an impregnated porous preform that includes a porous layer on all outer surfaces exposed to a melt.

An improved method for melt infiltration of an impregnated porous preform during fabrication of a ceramic matrix composite is described herein. The method may reduce the time required for melt infiltration and facilitate the melt infiltration of large-size and complex-geometry parts. The method may be particularly advantageous when the impregnated porous preform contains a large fraction of reactive elements, as discussed further below.

The method entails applying a surface slurry comprising a solvent and particulate solids on onto one or more outer surfaces of an impregnated porous preform. The impregnated porous preform comprises a framework of ceramic fibers that is loaded with particulate matter. The framework may be a two- or three-dimensional weave of the ceramic fibers, for example. The impregnated porous preform may be formed using a slurry infiltration process that is carried out before the surface slurry is applied.

After application to the one or more outer surfaces, the surface slurry is dried to form a porous layer comprising the particulate solids. As will be discussed further below, the particulate solids include ceramic particles and may also include one or more reactive elements, such as ceramic precursors. Each outer surface to which the surface slurry is applied may be covered in part or in full by the porous layer.

Once the porous layer is formed, an end portion of the impregnated porous preform that includes at least part of the porous layer is immersed in a molten material. The molten material infiltrates the impregnated porous preform from the end portion. Meanwhile, the porous layer serves as a wick to transport the molten material over the one or more outer surfaces for infiltration into the impregnated preform from other portions thereof. Thus, due to the presence of the porous layer, melt infiltration may be carried out faster and more effectively, even for very large or complex-geometry parts.

The ceramic fibers that serve as the framework of the impregnated porous preform typically comprise silicon carbide, but may also or alternatively comprise another ceramic, such as silicon nitride, alumina, aluminosilicate, or carbon. The particulate matter contained in the impregnated porous preform includes ceramic particles that become part of the ceramic matrix after melt infiltration. Typically, these ceramic particles comprise silicon carbide, but they may also or alternatively include silicon nitride, alumina, aluminosilicate, and/or boron carbide or another refractory carbide. In a preferred embodiment, the ceramic fibers comprise silicon carbide, and the ceramic particles (and ultimately the ceramic matrix) also comprise silicon carbide. The ceramic matrix composite that is formed in this case may be referred to as a silicon carbide/silicon carbide or SiC/SiC composite. The particulate solids used to form the porous layer on the surface of the impregnated porous preform may include the same or different ceramic particles as contained in the porous preform. Typically, the ceramic particles of the porous layer also comprise silicon carbide. As used herein, the term "silicon carbide" refers broadly to the compound SiC as well as to other silicon-containing carbides.

Prior to melt infiltration, the particulate matter that makes up the porous layer and the particulate solids contained in the preform may comprise, in addition to the ceramic particles, one or more reactive elements. Exemplary reactive elements include carbon (e.g., graphite, carbon black, diamond) and/or refractory metals such as molybdenum, tungsten, and/or titanium. The reactive element(s) are present to react with the molten material during melt infiltration and form a desired reaction product. For example, the reactive element may be a ceramic precursor that can react with a molten metal or alloy (e.g., silicon metal or a silicon alloy) to form a ceramic (e.g., silicon carbide). Other reactive elements may react with a molten metal to form an alloy in the molten state which may then react with a ceramic precursor to form a ceramic. For example, molybdenum may be used as a reactive element to form a Si—Mo alloy when exposed to molten silicon, which may then react with carbon to form a carbide including both molybdenum and silicon.

Accordingly, the reactive elements contained in the porous preform can react with the molten metal (or alloy) during melt infiltration and produce a ceramic reaction product that may ultimately form, along with the ceramic particles, the ceramic matrix of the fiber composite. Some of the molten material may remain unreacted during melt infiltration, however. For example, in the case of SiC/SiC composites, from about 5 vol. % to about 20 vol. % of the composite may be unreacted silicon. It is usually beneficial to reduce the amount of unreacted metal in the final composite. To achieve this, higher amounts of reactive elements may be incorporated into the porous preform to increase reactions with the molten material. However, the formation of some ceramic reaction products can involve significant amounts of volume expansion; for example, the formation of silicon carbide from the reaction of molten silicon with carbon during melt infiltration may be associated with a volume expansion of about 2.3 to 3.7 times. Consequently, the presence of significant amounts of reactive elements in the impregnated porous preform during melt infiltration may lead to pore obstruction, thereby slowing or even stopping infiltration. It is in such situations that the surface slurry method described herein may be most beneficial, since the porous layer that is formed on the surface of the impregnated porous preform can create alternative pathways for infiltration.

The surface slurry may be applied to the outer surface(s) of the impregnated porous preform by any of a number of methods, including dip coating, spray coating, solution casting and/or brushing on. The application may be carried out at room temperature (e.g., from about 15° C. to about 25° C.). The solvent in which the particulate solids are suspended may be an aqueous or organic solvent, such as water, ethanol, methanol, isopropyl alcohol, methyl ethyl ketone, or toluene. The surface slurry may further include a binder, such as polyethylene glycol, acrylate co-polymers, latex co-polymers, and/or polyvinyl butyral, and/or a dispersant, such as ammonium polyacrylate, polyvinyl butyral, a phosphate ester, polyethylene imine, or BYK® 110 (Byk USA, Wallingford, Conn.).

Drying of the surface slurry may be carried out at room temperature or at an elevated temperature (e.g., from about 40° C. to about 150° C.). The drying may be carried out in an ambient environment or a controlled environment, such as under vacuum conditions or in an inert gas atmosphere. After drying, the thickness of the resulting porous layer may be from about 0.005 in (~0.1 mm) to about 0.040 in (~1.0 mm). Further processing, as described below, may be employed to reduce the thickness of the porous layer.

As noted above, the surface slurry may be applied to all or part of one or more outer surfaces of the impregnated porous preform 110. As shown in FIG. 1 for example, the surface slurry may be applied to the entirety of the outer surfaces 120, or to the entirety of the outer surfaces that contact a melt (or molten material) 115, in order to form the porous layer 105. Accordingly, when an end 110a of the preform 110 is immersed in the molten material 115 for melt infiltration, the outer surfaces 120 covered by the porous layer 105 can serve as a conduit for the molten material 115.

Figure 2:
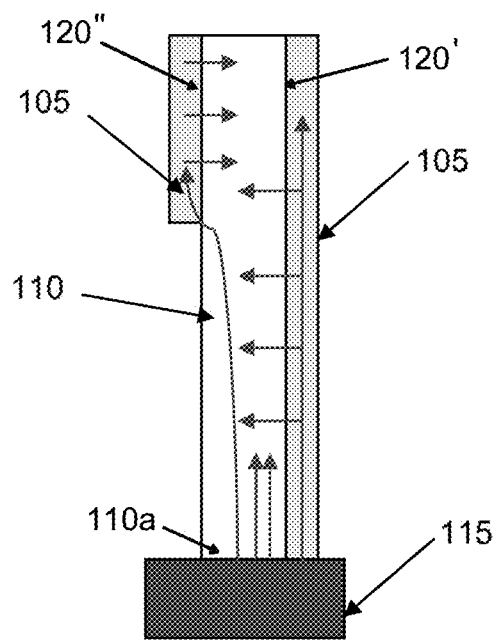
FIG. 2 is a schematic showing a melt infiltration process carried out on an impregnated porous preform that includes a porous layer on two outer surfaces.
Figure 3:
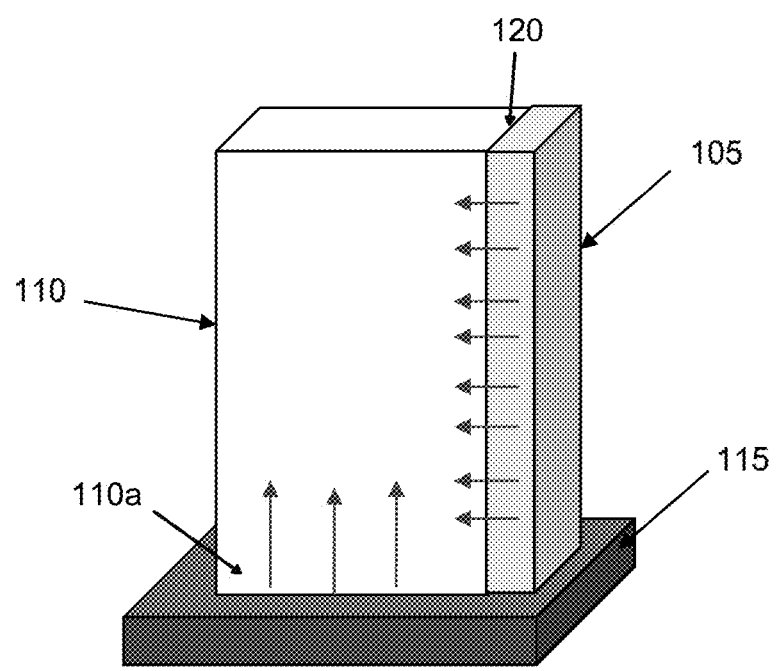
FIG. 3 is a schematic showing a melt infiltration process carried out on an impregnated porous preform that includes a porous layer on a single outer surface.

FIGS. 2 and 3 show alternative embodiments in which the impregnated porous preform 110 is only partially coated with the surface slurry to form the porous layer 105. In FIG. 2, one outer surface 120' of the impregnated porous preform 110 in contact with the melt 115 is completely coated with the porous layer 105, and another outer surface 120" is partially coated with the porous layer 105. In FIG. 3, a single outer surface 120 of the preform 110 is fully coated with the porous layer. When an end 110a of the impregnated porous preform 110 is immersed in the molten material 115 for melt infiltration, only the parts of the outer surfaces 120 that are coated with the porous layer 105 may serve as pathways for the molten material 115.

The temperature at which melt infiltration is carried out depends on the metal or alloy forming the melt. In the case of silicon, which has a melting temperature ($T_m$) of 1414° C., the temperature may be from about 1410° C. to about 1500° C. Generally speaking, the temperature for melt infiltration is at or above $T_m$ of the metal or alloy. Typically, melt infiltration is carried out for a time duration of several minutes to hours, depending in part on the size and complexity of the component. Because the porous layer formed on the impregnated porous preform may enhance the flow of the molten material over the outer surface, allowing infiltration to occur over multiple pathways, the infiltration time may be significantly reduced. In addition, the infiltration may be carried out more completely over a given time duration, such that even parts of the preform that are farthest from the melt may be completely infiltrated. For example, an impregnated porous preform that is coated with the porous layer may be completely infiltrated from end to end over a given time period, whereas the same impregnated porous preform without the porous layer may be infiltrated over only a portion of the preform during the same time period, with the uninfiltrated portion being farthest from the melt.

Typically, prior to infiltration with the molten material, the impregnated porous preform comprises a loading level of particulate matter of from about 40 vol. % to about 60 vol. %, with the remainder being porosity. The majority of the particulate matter comprises ceramic particles, and typically from about 2 wt. % to about 12 wt. % of the particulate matter may be reactive elements. The impregnated porous preform may be formed by a slurry infiltration process prior to the application of the surface slurry. Slurry infiltration may entail infiltrating a slurry composition comprising a solvent and the particulate matter into a porous preform comprising the framework of fibers, followed by drying the remove the solvent. Any of the solvents set forth above may be used. The reactive elements (e.g., carbon) may also or alternatively be incorporated into the porous preform after slurry infiltration (but typically before application of the surface slurry on the surface) by infiltration with a resin or char-yielding polymer. Slurry infiltration may further be preceded by a chemical vapor infiltration process and by construction of the porous preform using fabrication methods known in the art.

The porous layer on the outer surface(s) of the preform may in some cases comprise a lower fraction of solids than the interior of the impregnated porous preform. For example, the loading level of particulate solids in the porous layer may be from about 30 vol. % to about 60 vol. %, or from about 30 vol. % to about 50 vol. %, with the remainder being porosity. Preferably, the particulate solids are selected to have a size and morphology suitable for creating a porous structure that can effectively transporting molten material over the surface by capillary action during melt infiltration. The particulate solids in the surface slurry may also contain a lower loading of reactive elements than the particulate matter in the impregnated porous preform (e.g., about 50% of the amount of the latter). In some cases, no reactive elements may be included in the surface slurry, and generally speaking the amount of reactive elements may be up to but not higher than the amount used in the porous preform. Suitable reactive elements for the surface slurry include carbon (e.g., graphite, carbon black, diamond) and/or refractory metals such as molybdenum, tungsten, and/or titanium. Since the primary function of the porous layer is to provide multiple channels for flow of the molten material over the surface and into the preform, when used, the reactive elements in the surface slurry may be different from the reactive elements in the porous preform. In one example, a reactive element that promotes wetting of the molten material on the particulate solids of the porous layer may be selected for the surface slurry. In another example, a reactive element that reacts with molten silicon to form a molten silicon alloy may be selected for the surface slurry, while the impregnated porous preform may contain one or more ceramic precursors designed to react with the molten silicon metal or silicon alloy to form a ceramic reaction product.

During melt infiltration, as the molten material flows over the outer surfaces(s) and infiltrates the preform, the molten material may react with any reactive elements present in the porous layer and/or in the preform, as described above. After infiltration, the molten material is cooled, and a ceramic matrix composite comprising the ceramic fibers embedded in a ceramic matrix is formed. The ceramic matrix is formed from the particulate matter in the preform as well as any ceramic reaction products created from the reaction between the molten material and the reactive element(s) in the preform. The ceramic matrix may also include a residual amount of unreacted metal or alloy, typically silicon or a silicon alloy. After melt infiltration, the porous layer may be described as an infiltrated porous layer or as a ceramic coating that includes one or more ceramics, such as one or more carbides, nitrides, silicides and/or borides, and, in some cases, a residual amount of unreacted metal or alloy (again, typically silicon or a silicon alloy). The ceramic coating may remain on the CMC or may be removed in whole or in part (e.g., by machining).

It may be beneficial to reinforce the porous layer by incorporating a reinforcement structure into the surface slurry that is applied to the outer surface of the impregnated porous preform during processing. Alternatively, the reinforcement structure can be applied to the surface of the impregnated porous preform prior to applying the surface slurry. The reinforcement structure may take the form of a woven fabric comprising a polymer such as polyester. In some cases, the reinforcement structure may help to control the distribution of the particulate solids in the porous layer by acting as a wetting layer during application of the surface slurry. As the surface slurry is dried, heat applied to evaporate the solvent may simultaneously decompose the reinforcement structure, leaving the particulate solids in a distribution determined at least partly by the reinforcement structure geometry. Alternatively, the reinforcement structure may not be removed during drying, and instead may serve to reinforce the porous layer before and after melt infiltration, thereby improving the crack-resistance and toughness of the resulting ceramic coating on the CMC.

The porous layer, which may include a reinforcement structure as described above, may be machined either before or after melt infiltration. It may be advantageous to machine the porous layer prior to infiltration, since the porous layer can be readily machined in the green state. Machining may allow for control over not only the thickness of the porous layer, but also over the surface finish. Melt infiltration of the porous layer after machining may produce a CMC having a ceramic coating with a predetermined surface finish (e.g., an average roughness, $R_a$, better than about 200 micro-inches). The ceramic coating may also or alternatively have a low thickness of from about 0.5 mil to about 5 mils, which may be enabled in part by the presence of one or more reinforcement structures in the ceramic coating. In addition, given the improvements in the effectiveness of the melt infiltration process when the porous layer is applied to the outer surface of the preform, the CMC may include an exceptionally low amount of residual metal (or alloy). For example, in the case of a SiC/SiC composite, the amount of residual silicon may be about 5 vol. % or less, or about 3 vol. % or less.

Accordingly, a ceramic matrix composite (CMC) component that may be formed as described above is set forth herein. The component comprises a composite body having a ceramic coating on one or more surfaces thereof. The composite body includes ceramic fibers dispersed in a ceramic matrix and contains an amount of residual metal of about 5 vol. % or less. The ceramic coating may have a surface finish comprising an average surface roughness of about 200 micro-inches or less. In one example, the composite body includes silicon carbide fibers embedded in a silicon carbide matrix, and the residual metal is silicon. Alternatively, the composite body may comprise other ceramic matrices and/or ceramic fibers, such as those described elsewhere in this disclosure. The ceramic coating on the composite body may also comprise silicon carbide or another of the ceramics described in the present disclosure, as well as some amount of the residual metal. In some embodiments, the ceramic coating may include a reinforcement structure as described above. For example, the reinforcement structure may comprise a polymer, such as polyester. Advantageously, the ceramic coating may have a thickness of from about 1 mil to about 20 mils, due to the ease of machining the porous layer that serves as a precursor to the ceramic coating during fabrication. The ceramic coating may cover an entirety of the composite body, or only one or more portions thereof. The CMC component may be used as a gas turbine engine component or for another application. For example, the CMC component may be a seal segment, blade, vane or combustor liner for a gas turbine engine.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

Although considerable detail with reference to certain embodiments has been described, other embodiments are possible. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages, and it is not necessarily expected that all of the described advantages will be achieved with every embodiment.

The invention claimed is:

1. A method of melt infiltration for producing a ceramic matrix composite, the method comprising:
    applying a surface slurry onto one or more outer surfaces of an impregnated porous preform comprising a framework of ceramic fibers loaded with particulate matter, the surface slurry comprising a solvent and particulate solids;
    drying the surface slurry to form a porous layer comprising the particulate solids on the one or more outer surfaces; and
    after forming the porous layer, immersing an end portion of the impregnated porous preform into a molten material, the end portion including at least part of the porous layer, the molten material being infiltrated into the impregnated porous preform from the end portion,
    wherein the porous layer serves as a wick to transport the molten material over the one or more outer surfaces, thereby enabling melt infiltration of the impregnated porous preform from other portion of the porous layer not immersed in the molten material.

2. The method of claim 1, wherein applying the surface slurry comprises dip coating, solution casting, spray coating and/or brushing on.

3. The method of claim 1, wherein the surface slurry covers only a portion of the one or more outer surfaces.

4. The method of claim 1, wherein the surface slurry covers an entirety of the one or more outer surfaces.

5. The method of claim 1, wherein the porous layer comprises a thickness of from about 0.1 mm to about 1 mm.

6. The method of claim 1, further comprising incorporating one or more reinforcement structures into the surface slurry prior to application to the one or more outer surfaces.

7. The method of claim 6, wherein the one or more reinforcement structures comprises a woven fabric comprising a polymer.

8. The method of claim 1, wherein, prior to infiltration of the molten material, the porous layer comprises a loading of the particulate solids of from about 30 vol. % to about 60 vol. %, the particulate solids including ceramic particles comprising a ceramic selected from the group consisting of: silicon carbide, silicon nitride, alumina and aluminosilicate.

9. The method of claim 8, wherein the particulate solids further comprise one or more reactive elements selected from the group consisting of carbon, molybdenum, tungsten and titanium.

10. The method of claim 1, wherein, prior to infiltration of the molten material, the impregnated porous preform comprises a loading of the particulate matter of from about 40 vol. % to about 60 vol. %, the particulate matter including ceramic particles selected from the group consisting of silicon carbide, silicon nitride, alumina and aluminosilicate, and the particulate matter further comprising one or more reactive elements in an amount from about 2 wt. % to about 12 wt. %.

11. The method of claim 1, further comprising, prior to infiltrating the molten material, machining the porous layer.

12. The method of claim 1, further comprising, after infiltration of the molten material, cooling the molten material to form a composite body including a ceramic coating thereon,
    wherein the ceramic fibers comprise a ceramic selected from the group consisting of: silicon carbide, silicon nitride, alumina, and aluminosilicate.

13. The method of claim 12, further comprising, after cooling, machining the ceramic coating.

14. The method of claim 12, wherein the ceramic coating comprises a ceramic selected from the group consisting of: carbide, nitride, silicide and boride.

15. The method of claim 12, wherein the ceramic coating further comprises silicon.

* * * * *